(12) United States Patent
Hamann et al.

(10) Patent No.: US 7,739,073 B2
(45) Date of Patent: *Jun. 15, 2010

(54) METHOD AND APPARATUS FOR THREE-DIMENSIONAL MEASUREMENTS OF PHYSICAL CHARACTERISTICS WITHIN A DATA CENTER

(75) Inventors: Hendrik F. Hamann, Yorktown Heights, NY (US); Madhusudan K. Iyengar, Kingston, NY (US); James A. Lacey, Mahopac, NY (US); Martin P. O'Boyle, Cortlandt Manor, NY (US); Roger R. Schmidt, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/110,732

(22) Filed: Apr. 28, 2008

(65) Prior Publication Data
US 2008/0239539 A1 Oct. 2, 2008

Related U.S. Application Data

(63) Continuation of application No. 11/195,426, filed on Aug. 2, 2005, now Pat. No. 7,366,632.

(51) Int. Cl.
*G01K 1/06* (2006.01)
*G06F 17/40* (2006.01)
(52) U.S. Cl. .................. 702/130; 702/132; 702/150; 702/152; 374/141; 374/142
(58) Field of Classification Search ............ 702/130, 702/150, 152, 132
See application file for complete search history.

(56) References Cited

U.S. PATENT DOCUMENTS

| 5,930,738 | A * | 7/1999 | Jones ................... 702/132 |
| 6,246,969 | B1 | 6/2001 | Sinclair et al. |
| 6,535,382 | B2 | 3/2003 | Bishop et al. |
| 6,628,520 | B2 | 9/2003 | Patel et al. |
| 6,694,759 | B1 | 2/2004 | Bash et al. |
| 6,981,915 | B2 | 1/2006 | Moore et al. |
| 7,222,043 | B2 * | 5/2007 | Augustin et al. ......... 702/132 |

(Continued)

OTHER PUBLICATIONS

Sarachik, "Characterising an Indoor Environment with a Mobile Robot and Uncalibrated Stereo", *Robotics and* Automation, 1989 IEEE International Conference on Robotics and Automation, May 14-19, 1989, Scottsdale, AZ, vol. 2, pp. 984-989.

*Primary Examiner*—Hal D Wachsman
(74) *Attorney, Agent, or Firm*—Jose Gutman; Fleit Gibbons Gutman Bongini & Bianco P.L.

(57) ABSTRACT

An apparatus and method for measuring the physical quantities of a data center during operation and method for servicing large-scale computing systems is disclosed. The apparatus includes a cart that supports a plurality of sensors. The cart is moveable within the data center. The sensors capture temperature or other physical parameters within the room. The sensor readings, along with position and orientation information pertaining to the cart are transmitted to a computer system where the data is analyzed to select the optimum temperature or other system environmental parameters for the data center.

4 Claims, 11 Drawing Sheets

U.S. PATENT DOCUMENTS

| | | | |
|---|---|---|---|
| 7,366,632 B2 * | 4/2008 | Hamann et al. | 702/130 |
| 2005/0137824 A1 | 6/2005 | Augustin et al. | |
| 2006/0047466 A1 * | 3/2006 | White | 702/130 |
| 2006/0100816 A1 | 5/2006 | Prentice et al. | |
| 2006/0232945 A1 | 10/2006 | Chu et al. | |

* cited by examiner

METHOD AND APPARATUS FOR THREE-DIMENSIONAL MEASUREMENTS OF PHYSICAL CHARACTERISTICS WITHIN A DATA CENTER

CROSS-REFERENCE TO RELATED APPLICATIONS

This application is a continuation of and claims priority from prior U.S. patent application Ser. No. 11/195,426, filed on Aug. 2, 2005, now U.S. Pat. No. 7,366,632, the entire disclosure of which being herein incorporated by reference in its entirety. This application is also related to pending U.S. patent application Ser. No. 12/110,698, filed on Apr. 28, 2008.

FIELD OF THE INVENTION

This invention generally relates to the field of thermal measurement and more specifically to thermal measurement of data centers.

DESCRIPTION OF RELATED ART

There are many cases where it is desirable to accurately measure, analyze, and optimize the environmental characteristics of an area. One such area is a data center. A data center is a room wherein rows of equipment racks and enclosures situated side by side in very large numbers are located. The equipment racks and enclosures contain and organize communications and information technology equipment, such as servers, internetworking equipment and storage devices. Each piece of the rack-mounted equipment consumes electrical power and generates heat. The amount of heat generated corresponds to the amount of power consumed by each piece of equipment. Naturally, the total heat output of a single rack is the result of a cumulative affect of the heat generated by each piece of rack-mounted equipment. As a result, the heat output of each rack may vary greatly, depending upon the type of equipment, the duty cycle of use of each piece, the ambient temperature, and especially the cooling system being used.

Heat produced by rack-mounted equipment can have adverse effects on the performance, reliability and useful life of the equipment components. In particular, rack-mounted equipment housed within an enclosure is particularly vulnerable to heat build-up and hot spots produced within the confines of the enclosure during operation.

The problem is compounded by a dramatic surge of power consumption in computing systems that has significantly increased the costs of cooling, infrastructure, and energy of data centers and supercomputers. For example, just 25 years ago the typical dissipated power in a computer rack was only ~1 kW while today we are reaching power levels of almost 40 kW in a similar size rack. It is inevitable that future rack power levels will increase even further.

Therefore, the thermal design of these large scale computing systems has emerged as one of the key challenges for any data center. To this end, a much more detailed understanding of the thermal implications of the physical layout is warranted.

Attempts to thermally profile data centers using field data or performing simulations using computer based models have yielded unsatisfactory results, lacking the accuracy, turn around, and ease of interpretation which is needed to optimize data center layouts.

There is no suitable technique and method available which can readily map the temperature distribution in three dimensions in the data center.

Therefore a need exists to overcome the problems with the prior art as discussed above.

SUMMARY OF THE INVENTION

Briefly, in accordance with the present invention, disclosed is an apparatus and method for measuring physical characteristics, e.g., the thermal distributions and other measurements, such as relative humidity, absolute humidity, barometric pressure, and wind flow rate, wind speed and wind direction, in a data center. In an embodiment of the present invention, the system includes a framework with a plurality of sensors. Each sensor is physically coupled to the framework. Each sensor being at a different location on the framework. Each sensor of the plurality of sensors measures at least one physical characteristic of an environment within a data center.

The system further includes a means for communicating the measured physical characteristic from at least one of the plurality of sensors, location information, and/or orientation information to a data storage device. The location information can relate to the location of the framework in the data center. It can also relate to the location of at least one of the plurality of sensors. The orientation information can relate to the orientation of the framework in the data center. It can also relate to the orientation of at least one of the plurality of sensors.

The framework, according to an embodiment, is shaped and dimensioned so that at least one of the sensors is able to measure a physical characteristic directly above a rack in the data center and on a side of a rack in the data center.

The framework is provided with a means for movement, and more particularly at least one friction reducing device, such as a set of wheels that allow the framework to be moved to locations within the data center. In one embodiment, a motor is couple to and drives the wheels, allowing the apparatus to be positioned within the data center.

In an embodiment of the present invention, a method for measuring at least one physical characteristic, e.g., the thermal distributions within a data center, is disclosed. The method includes placing a physical/environmental parameter measuring cart within a data center, measuring at least one physical/environmental characteristic within the data center with at least one sensor on the framework, storing the measurements of the at least one physical characteristic on a data-storage device, and storing location information, such as location of the cart within the data center, on the data-storage device.

The method further includes transmitting the measurement data and the location information to a remote receiving device.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF THE PREFERRED EMBODIMENTS

Figure 1:
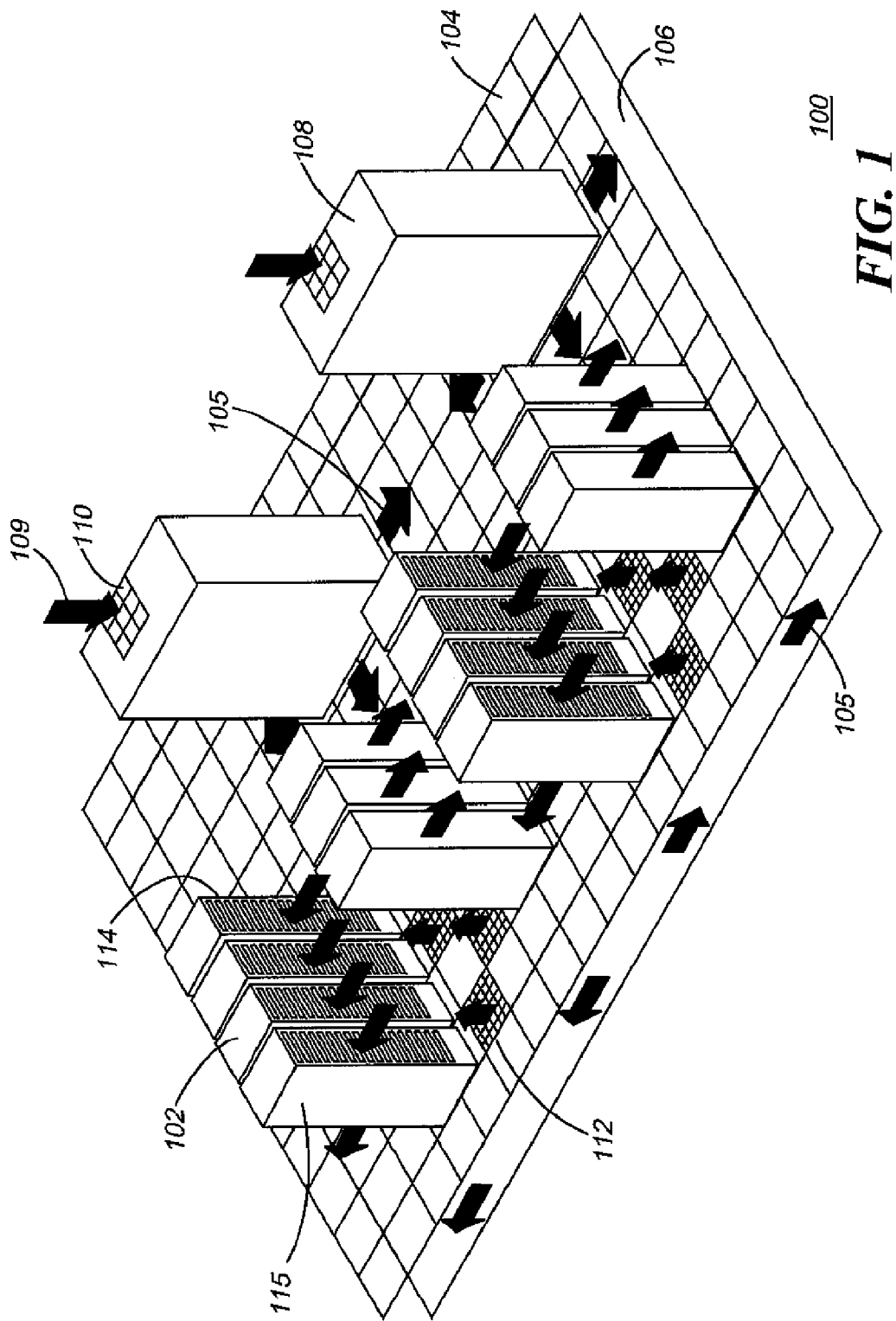
FIG. 1 is a perspective view of a data center.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to an embodiment, overcomes problems with the prior art by providing an efficient and easy-to-implement system and method for measuring the thermal distributions of a data center during operation.

Overview

In order to ascertain the thermal distributions of a data center under operating conditions, a method and apparatus are disclosed to determine the data center thermal properties as a function of location within the data center. In an embodiment of the present invention, a plurality of thermal sensors are mounted along a framework of a moveable cart. Each sensor is placed at a defined distance from each other sensor on the framework.

A plurality of sensors is not necessarily located along a horizontal axis. It may be, for example, oriented vertically or oriented along any other combination of axes depending on the design of a particular application of a framework, as should be obvious to those of ordinary skill in the art in view of the present discussion.

The cart is preferably taller than any of the racks in the data center and has portions that extend above the racks. The sensors can capture temperature measurements from near floor level to directly above the racks. The cart can be rolled through the data center while data logging the temperatures as a function of xyz coordinates. Thermal distributions generated from the data can be used to make adjustments to the design or the operation of the data center. Another useful application of the present invention makes it possible to redesign or adjust the cooling system in the data center as necessary. In other embodiments, the cart can also capture wind speed, wind direction, relative and absolute humidity, air pressure, and the like.

Data Center

An exemplary area suitable for use of the present invention is a data center. A data center is any room, area, volume, or part of a room containing any kind of information technology equipment. An exemplary data center 100 is illustrated in FIG. 1. The data center 100 is provided with a cooling system, which is an elevated-floor cooling system. It should be noted, however, that there are alternate configurations for the cooling system, e.g. a non-raised floor system, where cool air is blown into the room via diffusers that get the air from air conditioning units via ducts and the hot air enters the a/c units via the room. Although the remaining description discusses the elevated-floor cooling system, the present invention is useful for all types of cooling configurations.

As illustrated, a plurality of racks 102 are located on an elevated floor 104 so that there is room between the elevated floor 104 and a sub-floor 106 to allow cold air 105 to circulate therein. During operation, the racks 102 produce heat that is transferred to the ambient air to create hot air 109. The hot air 109 is sucked in by intakes 110 in one or more chillers 108. The chillers 108 intake the air 109, heated by the equipment of the data center 100, and transfer its heat to a cooling fluid (which is typically an aqueous solution, or a refrigerant) circulating within the chiller 108. The chiller then outputs cold air 105. The cold air is blown by the chillers 108 into a duct defined by the raised floor 104 and the sub-floor 106. The cold air moves through the duct and exits through strategically placed vented openings 112 in the surface of the elevated floor 104. The openings (i.e., perforated tiles) 112 enable the cold air blown by the chillers 108 to exit the duct created by the raised floor 104 and sub-floor 106 and to enter an area of the center 100 between rows of racks 102. As it can be seen from FIG. 1 in a typical data center the aisles are divided into hot and cold aisles: The cold air 105 is moved into cold aisles through the openings 112. The racks suck the cold air from the cold aisle into the racks 102 to cool the various components. The hot air from the rack is then dumped into a hot aisle, which then is sucked into the AC 109.

The racks 102 are provided with vented areas 114 along their covers 115 as well as fans or other circulation devices within the covers 115. The fans draw ambient air (preferably from the cold aisles) through the vents 114, into the closed racks 102, and across the devices and components within the racks 102. Vented areas on a side of the cover opposite the intake side of the cover allow the heated air to exit the racks 102, preferably to the cold aisle.

Obviously, the cooling effect of the air through a rack increases as the air temperature on the inlet side (cold aisle) of the rack decreases. By strategically placing the openings 112 in the raised floor 104 in close proximity to the areas of greatest heat within the center 100, hotspots, or concentrations of heat, around one or more racks can be reduced. Ideally, the vented openings 112 in the raised floor 104 will be positioned so that the center is balanced and all areas are at approximately the same temperature. In order to balance the room, however, an accurate model of the temperature in each position throughout the room is desired. In addition, the arrangement and density of the racks as well as the numbers of nodes within a rack can be optimized to avoid hot spots in certain regions of the datacenter.

The Cart

Figure 2:
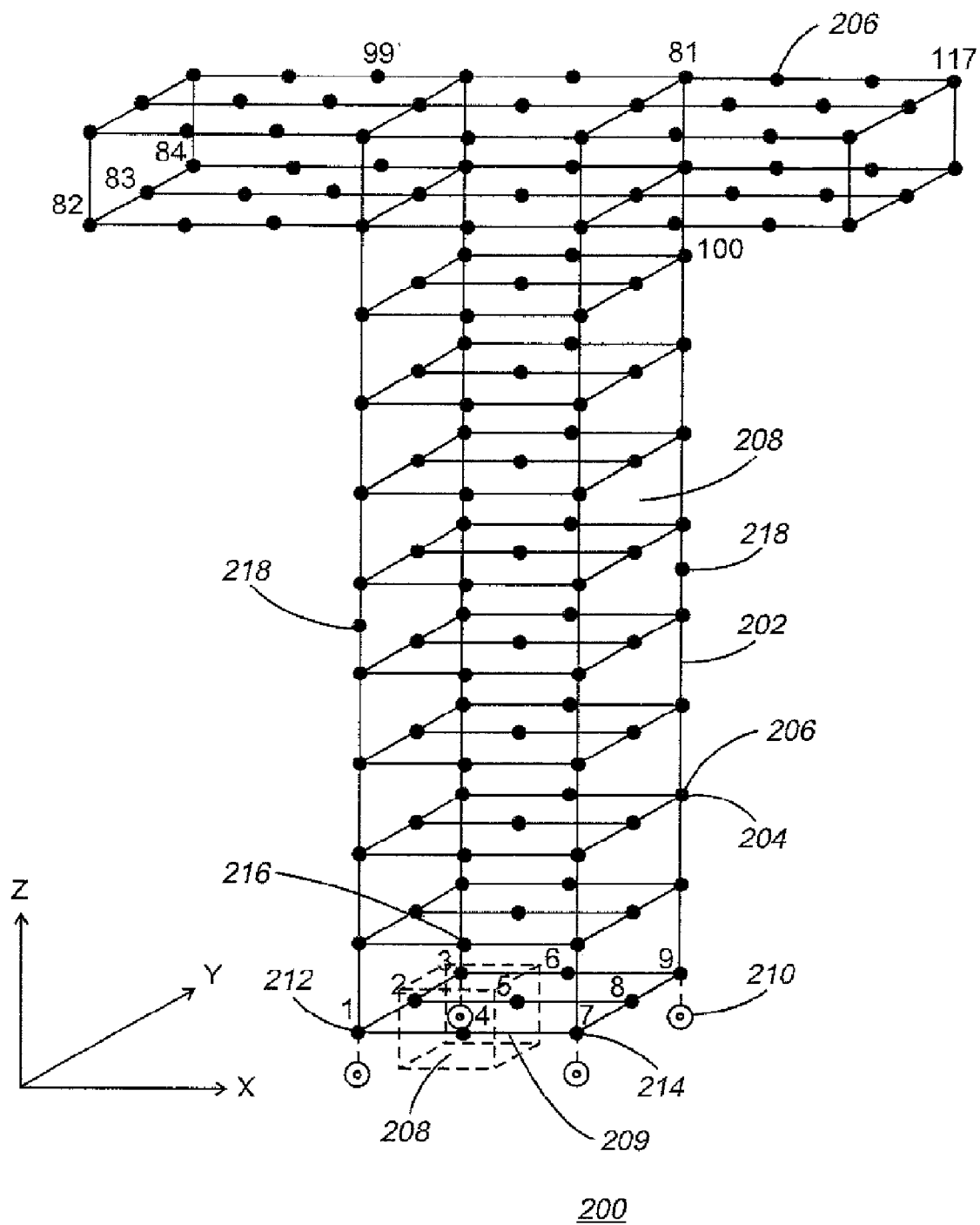
FIG. 2 is a perspective view depicting one embodiment of the present invention.

In an embodiment of the present invention, illustrated in FIG. 2, a cart 200 is defined by a framework of interconnected rods 202. Along the rods 202 and at rod intersections 204 are mounted thermal sensors 206. Each sensor 206 is at a defined distance from any other sensor 206. In one embodiment, the present invention is provided with as many as 117 sensors, although the number of sensors can be adjusted according to the application.

In the illustrated embodiment, the thermal sensors 206 are arranged such that they cover the corners of an imaginary unit cell, which extends vertically and horizontally away from the sensor 206 with a distance that is half the distance to the nearest adjacent sensor. In the figure, a unit cell 208, centered on a sensor 209, is defined by the distance between adjacent sensors 212, 214, and 216. If the dimensions of an exemplary first unit cell 208 is ⅔×⅔×1 feet, repeating the unit cell 208 within the cart 200 allows the capture of a temperature reading with a lateral (xy) resolution of ⅔ feet and 1 foot in the vertical (z) direction. It should be noted that these dimensions are only an illustrative example and other quantities of separation between the sensors can be used as well.

In one embodiment, the temperature sensors 206, or any other sensors used, are thermally "isolated" from the cart 200. For example, the sensor can be separated from the cart 200 by a low thermal conducting material, such as STYROPOR. Isolating the sensors from the cart ensures that the sensor readings reflect the ambient conditions in the data center and are not affected by the presence of the cart 200.

Measurement of physical quantities other than temperature may be desirable. For instance, the measurement of wind speed, wind direction or relative and/or absolute humidity may be needed. A few exemplary sensors for capturing physical quantities are thermocouples, negative and positive thermal resistive sensors, IR sensors, ceramic impedance moisture sensors, thin film polymer capacitance sensors, anemometric sensors and acoustic sensors. Sensors for physical quantities such as those mentioned are well known and the specifics of which will not be discussed herein.

In a preferred embodiment, the rods 202 defining the cart 200 are relatively thin so as to minimize the impact on wind flow when capturing a heat pattern. In one embodiment, the rod diameter is less than 1 inch, but can be other dimensions and may depend on material and desired strength. The rods 202 can be made of any rigid material that will statically hold the sensors 206. However, in preferred embodiments, the rod material is selected from a group of materials that have low thermal conductivity, such as plastic or composite material, that reduce a potential temperature influence on the sensors 206. In other embodiments, the framework may be covered with a skin or other material. The term "framework" is not limited to only connected rods.

Figure 3:
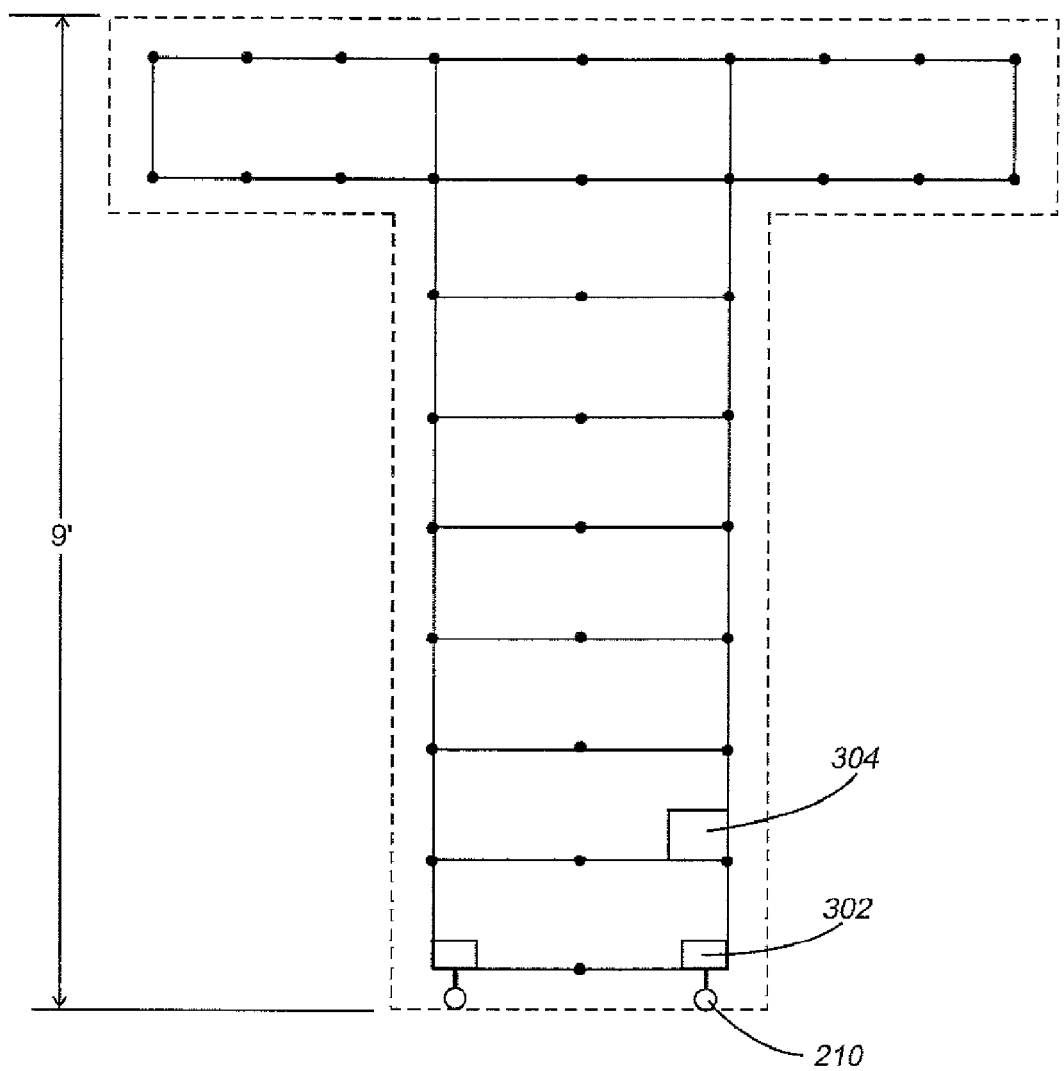
FIG. 3 is a cross sectional diagram depicting one embodiment of the present invention.

In one embodiment, the cart 200 is provided with a set of wheels 210 that allow the cart 200 to easily be moved to any unoccupied position within the center 100 so that measurements can be taken. Other friction-reducing devices can be used as well, such as castors, rollers, and the like. As shown in FIG. 3, the wheels 210 can be driven by one or more motors 302 attached to one or more of the wheels 210 so that operator intervention is reduced or eliminated. The motors 302 can be controlled by operator input, wired or wireless remote control, or wired or wireless computer control. It is envisioned that the cart can automatically move itself to every free tile in the data center and record temperatures without requiring operator input. While a cart 200 is used in this example to move in the data center to take the measurements, it should be obvious to those of ordinary skill in the art in view of the present discussion that other means for moving the sensors in the data center can be used without departing from the teachings of the present invention. For example, a wall mounted moving framework could be used to move sensors in the data center. As another example, a ceiling mounted framework could be used to move sensors and to take the measurements in the data center. Additionally, any combination of wall mounted and/or ceiling mounted framework or frameworks could be used to move sensors and to take the measurements in the data center.

As illustrated in FIGS. 2 and 3, the cart 200, in this example, is shaped like a "T" in order to map the temperature distributions above the racks within the data center. The dimensions of the cart 200 are governed by the general data center layout and the rack dimensions. For example, as can be seen in FIG. 3, the cart 200 allows accurate measurement of a 9-foot high data center with a granularity of ⅔×⅔×1 foot for racks 102 of up to 7.5 feet high and 4 feet deep. The dimensions given are exemplary only. Other dimensions can be used and are within the true spirit and scope of the present invention.

Figure 4:
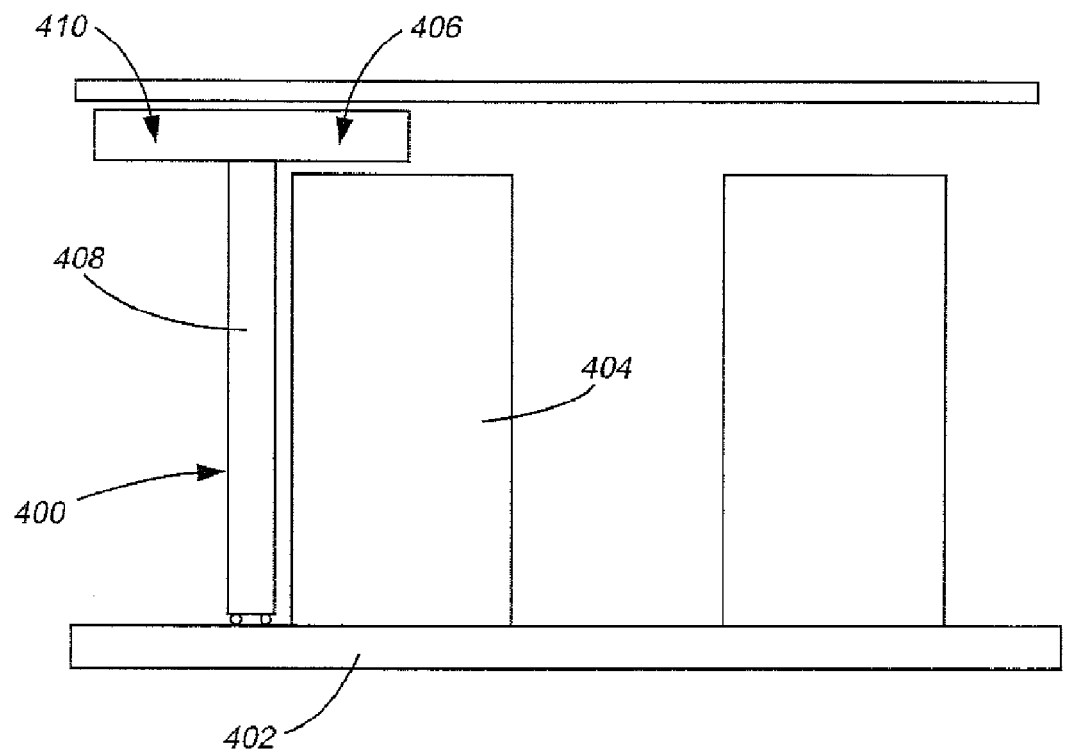
FIGS. 4-7 are illustrations of one embodiment of the present invention used to measure a set of racks within a data center.

FIGS. 4-7 show how the cart can be used to measure the three-dimensional distribution of a physical quantity, such as temperature, throughout the data center 100. In FIG. 4, a cart 400 rests on a floor 402 and is positioned adjacent to a rack 404 so that the right side 406 of the "T" section of the cart 400 is extended above the rack 404. In this configuration, the sensors along the main tower 408 of the cart 400, as well as the sensors on the right side 406 of the "T," are utilized to capture the physical quantity being measured. The sensors on the left side 410 of the "T" are not really needed for this measurement.

Figure 5:
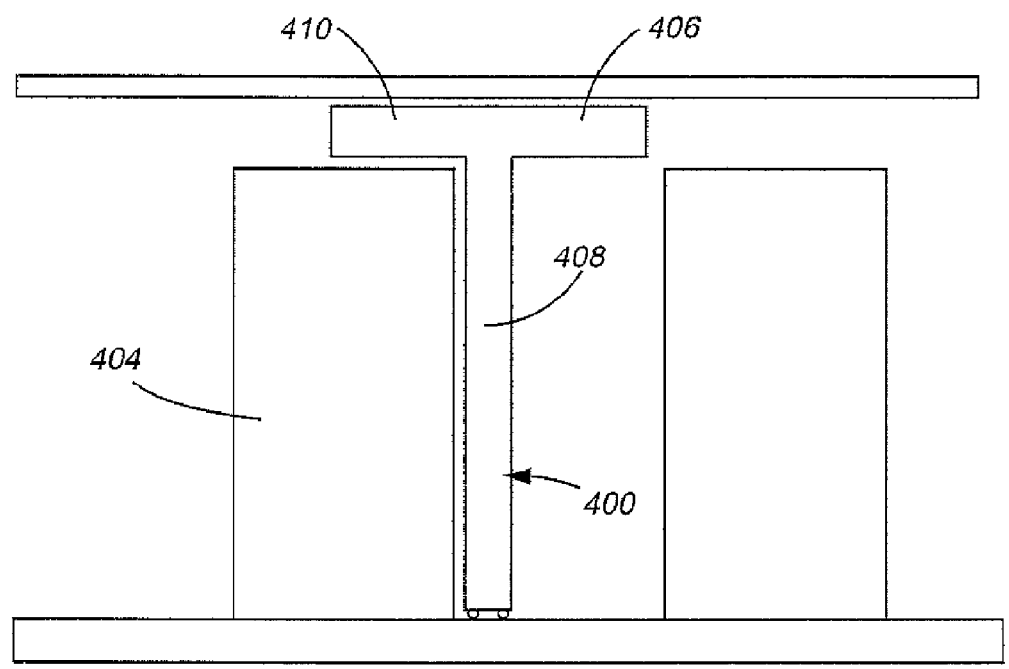

In FIG. 5, the cart 400 is moved to the opposite side of the rack 404 of FIG. 4. In this configuration, the left side 410 of the "T" is extending directly above the rack 404. Ideally, the "T" portion of the cart 400 is at least half the width of the rack 404, so that all regions above the rack 404 can be measured. In the configuration of FIG. 5, the sensors located in the left side 410 of the "T" section are utilized, while the sensors in the right side 406 of the "T" section are typically not. Sensors within the main tower section 408 are utilized.

Figure 6:
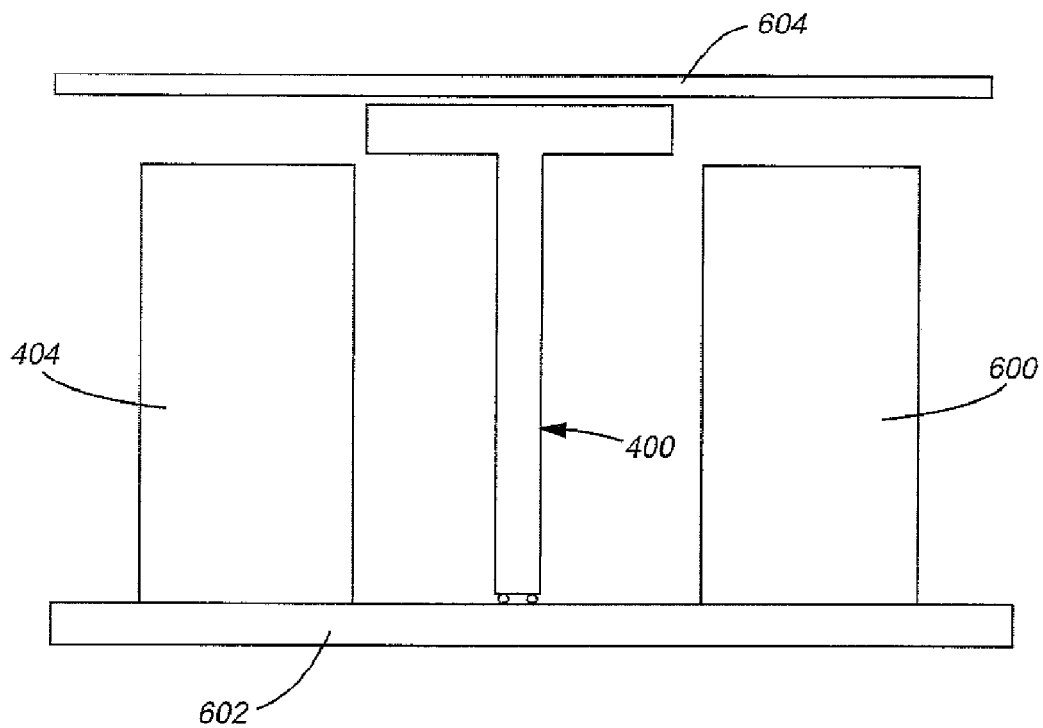

FIG. 6 shows the cart 400 located between two racks 404 & 600. As illustrated in FIG. 6, the "T" section of the cart 200 does not extend above either rack 400 or 600. In this configuration, the area being captured is from the floor 602 to the ceiling 604. Therefore, the sensors in the center tower section of the cart are able to capture all necessary measurements within this physical space. The "T" sections are not needed.

Figure 7:
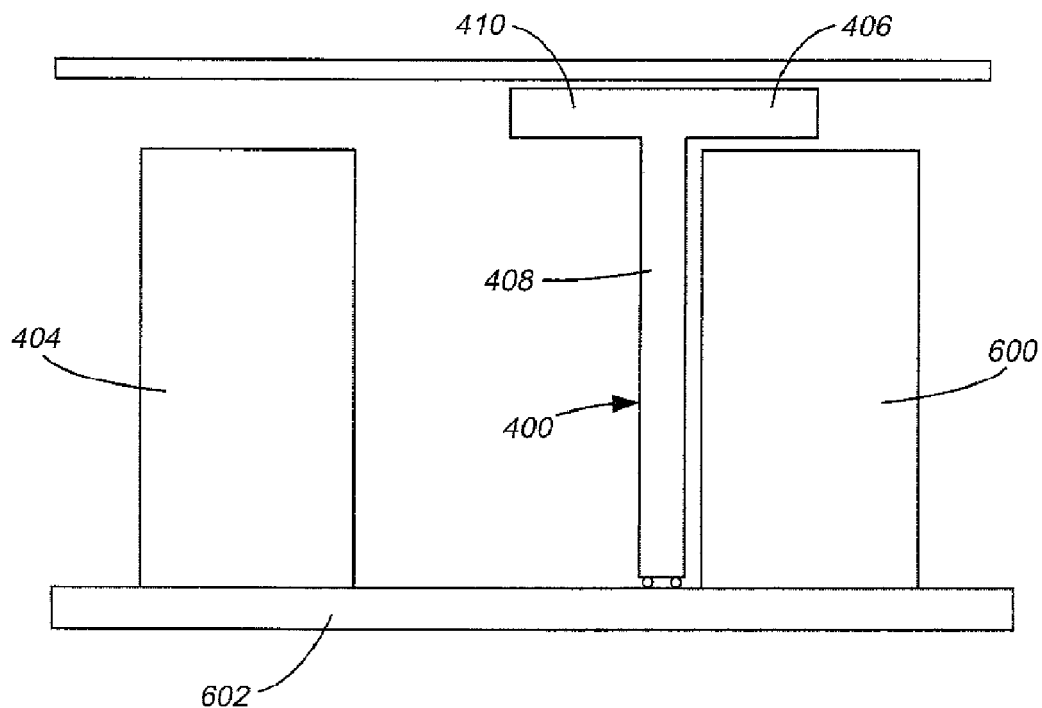

In FIG. 7, the cart 200 is moved one tile to the right so that the right side 406 of the "T" section 406 extends above the rack 600. This configuration is the same as described above, with reference to FIG. 4. The sensors along the central main tower 408 of the cart 400, as well as the sensors on the right side 406 of the "T," are utilized to capture the physical quantity being measured. The sensors on the left side 410 of the "T" are not needed and are not used for this measurement as they would be redundant with the measurement taken in FIG. 6.

One solution to reducing hotspots within the data center is to place a vented tile on a portion of the raised floor near the hotspot. In a preferred embodiment, the foot print of the cart is equal to or less than the dimensions of a tile on the raised floor 104. This granularity allows for better analysis and modeling of the effects of exchanging tiles.

In another embodiment of the present invention, the sensors are movable in relation to the framework of the cart. In this embodiment, the sensors record a measurement at a first location, move to a second location where they record a second measurement, move to a third location, and so on. This embodiment reduces the number of sensors needed and, therefore, reduces costs and failures.

In an additional embodiment of the present invention, the framework is extendable so that a single cart can accommodate a number of areas having different dimensions. The framework can be telescoping, foldable, attachable to additional framework pieces, or other similar methods of extension.

Computer System

As stated above, the present invention can be moved on wheels to every unoccupied tile in the data center where measurements are taken. In order to create a spatially accurate thermal characterization of the data center, specific sensors must be individually addressed, read, and logged at each location within the center. Additionally, lateral rotation of the cart should be detected, tracked, and logged. Referring back to FIG. 3, a computer system 304 is located on the cart 300.

Figure 8:
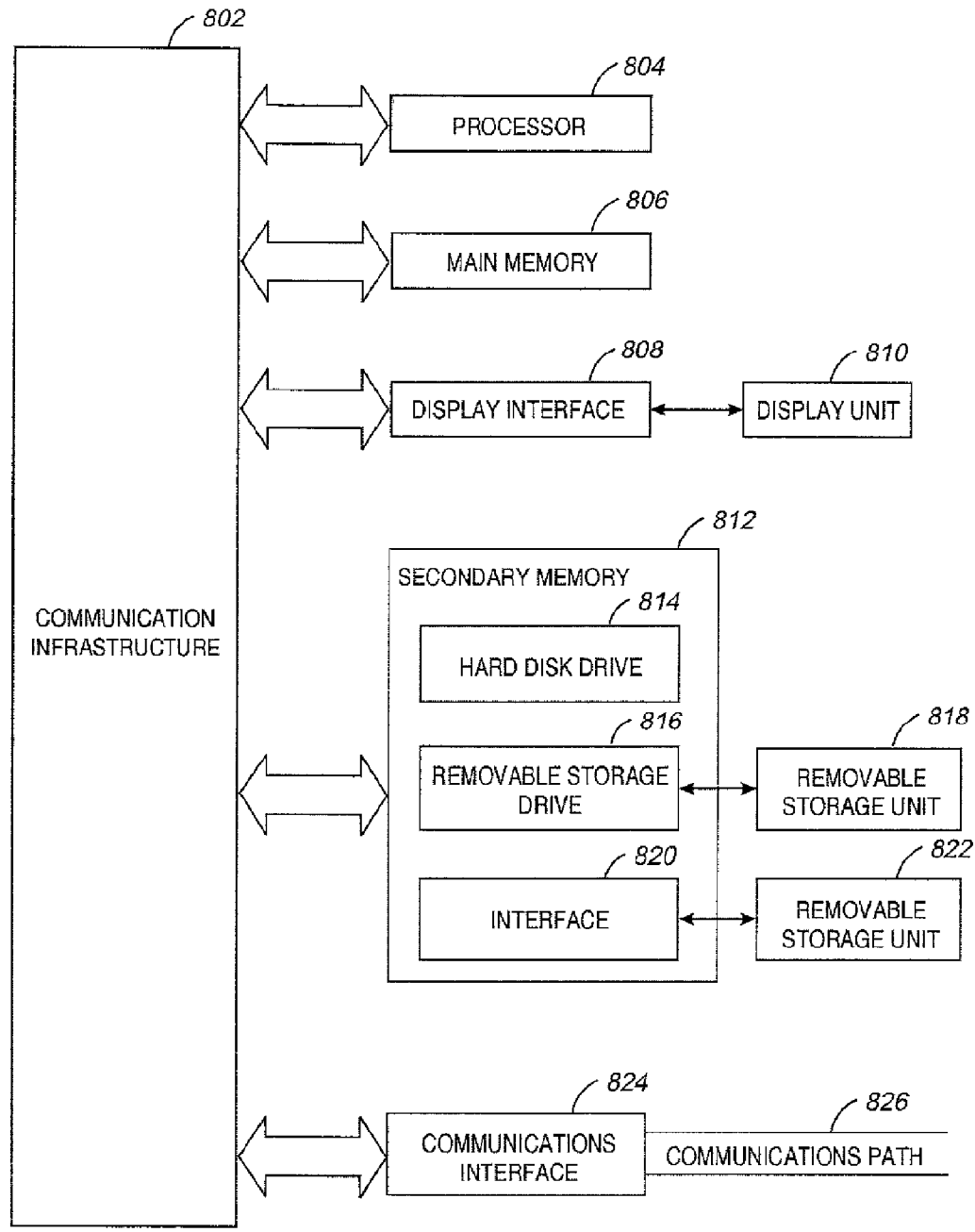
FIG. 8 is a block diagram of a computer system in which an embodiment of the present invention can be implemented.

FIG. 8 is a block diagram of a computer system with which an embodiment of the present invention can be implemented. A computer system may include, inter alia, one or more computers or computer cards and at least a computer readable medium, allowing a computer system, to read data, instructions, messages or message packets, and other computer readable information from the computer readable medium. The computer system includes one or more processors, such as processor 804. The processor 804 can be wired or wirelessly connected to a communication infrastructure 802, e.g., a network. After reading this description, it will become apparent to a person of ordinary skill in the relevant art(s) how to implement the invention in other computer systems and/or computer architectures.

The computer system may include a display interface 808 that forwards data from the communication infrastructure 802 for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, flash memory etc. The removable storage drive 816 may read from and/or write to a removable storage unit 818 in a manner well known to those having ordinary skill in the art. Removable storage unit 818, represents a floppy disk, magnetic tape, optical disk, flash memory, etc. which is read by and written to by removable storage drive 816. As will be appreciated, the removable storage unit 818 includes a computer usable storage medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices, such as temperature sensors. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information.

Figure 9:
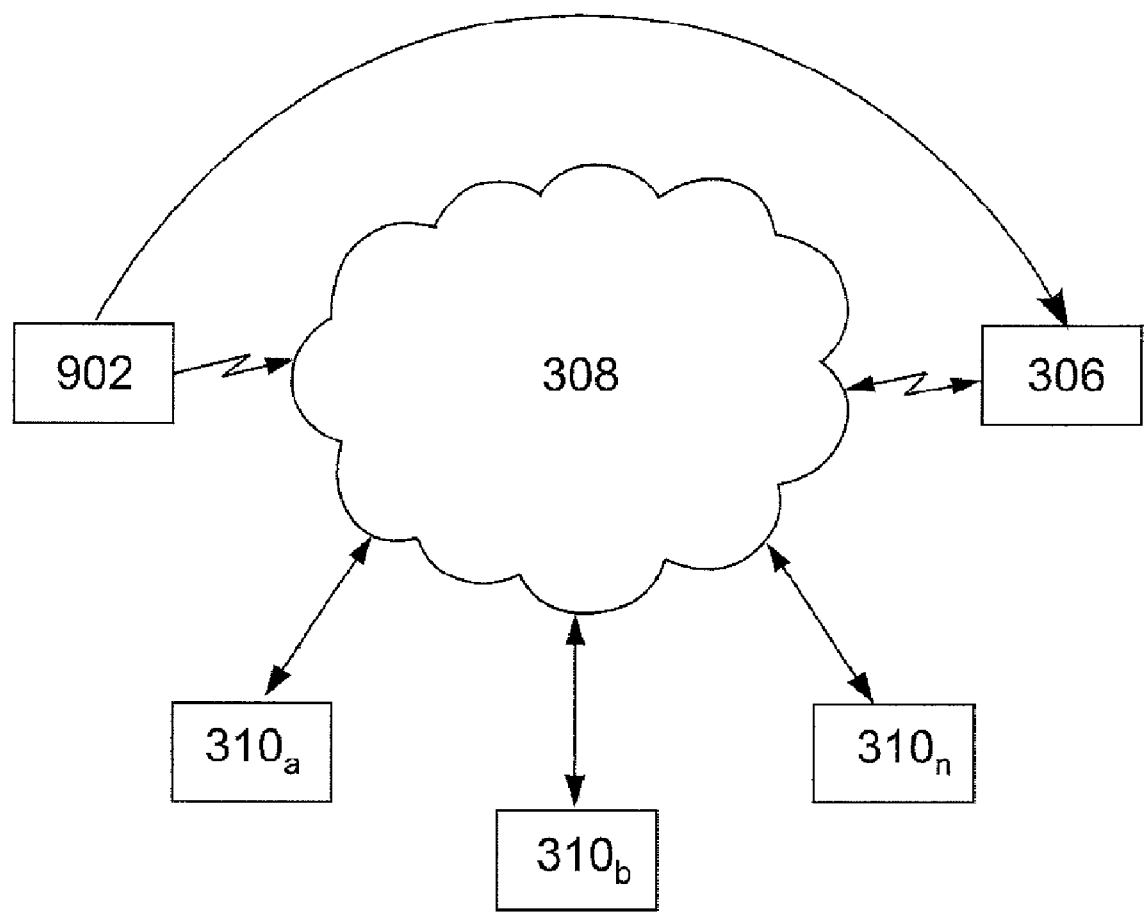
FIG. 9 is a block diagram depicting communication configurations according to embodiments of the present invention.

In one embodiment, each sensor is individually addressable. Each sensor is provided with a means for communication which includes wired or wireless communication. In a wired embodiment, each sensor connects to the communications interface 824 that allows the sensor measurements to be recorded by the computer system located on the framework or off. In other embodiments, as shown in FIG. 9, the sensor readings 902 are transmitted wirelessly to a remote computer system 306 by electromagnetic radiation, optical, sound, or other similar means of wireless communication. In still other embodiments, the data is transmitted, either wired or wirelessly, to a network 308, where the data is accessible to multiple computer systems 310a-310n for evaluation, storage, and other uses.

In one embodiment of the present invention, multiplex electronics are utilized to capture and record the sensor measurements. In this embodiment, all the sensor readouts are multiplexed using the multiplex electronics and then read by one analog to digital (A/D) card into the computer for storage, analysis, or manipulation.

In other cases, instead of using a complete computer system to store the data, it can be deposited onto a memory device and then off-loaded later. In short, any method of transmitting sensor readings to an information processing unit or memory device is contemplated and is within the spirit and scope of the present invention.

Software

Computer programs (also called computer control logic) are stored in main memory 406 and/or secondary memory 412. Computer programs may also be received via communications interface 424. Such computer programs, when executed, enable the computer system to perform the features of the present invention as discussed herein. In particular, the computer programs, when executed, enable the processor 404 to perform the features of the computer system. Accordingly, such computer programs represent controllers of the computer system.

Once the data is recorded and stored, software is used to read the data files and to manipulate or utilize the data as needed. An example of fortran-type computer code used in the present invention is given under the section entitled "Example of a Fortran-Type Computer Code". It should be noted that the computer code shown is for exemplary purposes only and the invention is not so limited. Additionally, the program shown in the section entitled "Example of a Fortran-Type Computer Code", or other equivalent methods, can be used to characterize quantities other than temperature, such as humidity, wind speed, pressure, and the like.

In this example, temperature data is read from one or more sensors at each free tile in the data center. The readings taken at each tile are then stored separately. Each data file consists of a single column of n individual temperature values received from the same number n of sensors read at a given tile location. An exemplary order of temperature sensors on the cart is shown in FIG. 2. In addition, there is a netlist file, which has stored the filename of each data file (from each already-measured tile location), the corresponding tile coordinates (x, y), the orientation (E, W, N, S) and which sides of the arms of the T is used (right, left, both, or nothing). The netlist file also includes a number indicating in which directory the data file has been stored.

The program first reads all the individual files, then it puts the data into three different three-dimensional arrays: the center block (cb) with 3×3×9 data points using the center of the "T" (sensors 1 to 81), the left block (lb) with 3×3×2 data points using the left arm of the "T" (sensors 82 to 99) and finally the right block (rb), with 3×3×2 data points using the right arm of the "T" (sensors 100 to 117).

Figure 10:
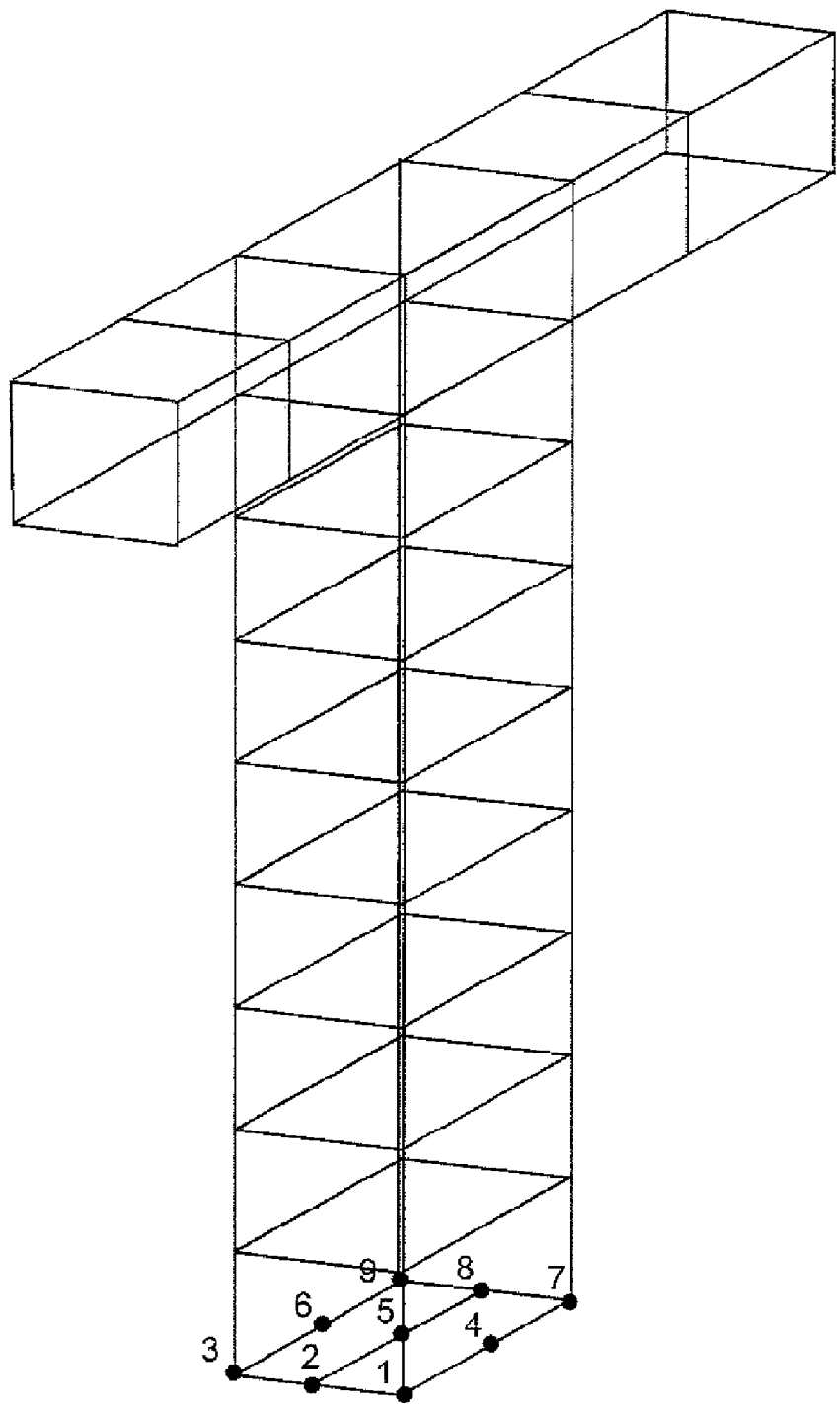
FIG. 10 is a perspective view depicting one embodiment of the present invention.

Using the orientation information (such as lateral movement) of the cart, the blocks are rotated laterally so that the same coordinate system is used throughout the data center. For instance, if the exemplary cart 200, shown in FIG. 2, is rotated 90 degrees counterclockwise, as shown in FIG. 10, the sensors 1-117 exchange places. Specifically, looking at sensors 1-9 on the lowest row, sensor 5 remains in the same position, while all other sensors rotate counterclockwise around sensor 5. As a result, after the lateral rotation, sensor 1 is where sensor 7 used to be, sensor 2 is where sensor 4 used to be, sensor 3 is where sensor 1 used to be, and so on. These new positions must be tracked so that when the sensor readings are later compiled, the positions can be factored into the calculations. Therefore, when the cart 200 is rotated, the data blocks (cb, lb, rb) have to be mathematically laterally rotated to correspond to the new orientation of the cart. Using the tile information (x and y coordinates of the tiles from the netlist file) the data blocks are stored into the right position of a global array (gtemp) which contains all the data in all three dimensions throughout the data center in the same coordinate system.

Rotation and position of the cart can be sensed by a position sensor. A few examples of position sensors are a global positioning system (GPS), a differential global positioning system (DGPS), which utilizes a radio link between a stationary GPS and a mobile GPS, a compass, one or more sensors coupled to the wheels of the cart, or other similar devices, which can all be contained within the computer 304 or other locations on the framework of the cart. The position and orientation data may be read and stored while data logging the sensors at a given location within the data center.

In some applications it is desired to control the motors 302 to move the cart by using the positioning and orientation data. A computer system, as described below, is able to coordinate this feedback. In addition the cart 200 could be equipped with one or more proximity sensors 218 (LEDs, bump sensors etc.) to help to control the motion. After each measurement is taken, the cart uses the position data, orientation data, and/or navigation sensors to move to a new open tile on the floor. The process repeats until every tile location has been measured. The additional sensors reduce or remove the need for operator interaction.

Once the data is collected, it can be rapidly organized into a format that is easy to view and manipulate. For instance, the data can be used to perform spatial data slices, generate contour plots & histograms, images, statistical output, generate single or multi-dimensional graphs, and others. It is one goal of the present invention to graphically and accurately represent the temperatures within the room as a function of the xy coordinates of the measurements.

In some applications the data is then transferred to a thermal expert, which can be a set of guidelines, a system that is able to evaluate the information and make decisions based on the data, or an actual person. The data can be transferred to the expert via Internet, wired communication, wireless communication, by physical transport of data on disk, or any other method of transferring data as is obvious to those of ordinary skill in the art in view of the present discussion.

After being evaluated by the thermal expert, recommendations are communicated to a location implementer that will modify the data center, if necessary, accordingly. Some of the adjustment options are, for example, to move, add, or remove perforated tiles, to move or remove racks within the data center, to move, add, or remove ducting of the cold air, and to move, add, or remove rear cover heat exchangers. The adjustment options are not limited to the previous choices, which are provided for illustration purposes and not for any limitation of the many different adjustment options, and can also include other options that will alter the environment as needed. By graphically representing the data center temperatures, or other aspects, cooling strategies, options, and locations can be intelligently selected.

Application of the Invention

As stated above, within an exemplary data center are a plurality of racks that hold heat-producing computer equipment. One or more cooling systems are used to control and remove heat produced by the equipment. Examples of cooling systems are overhead air ducting, side air ducting, underfloor air ducting that exit through vented tiles in the floor surface between the racks, internal refrigeration systems, and the like. Temperature information can be obtained by taking a single measurement or multiple measurements within the center. Additionally, more accurate temperature profiles can be obtained by taking consecutive measurements at locations that are in substantially close proximity to each previously measured location. In one embodiment, for ease of uniformity, the inventive cart is placed on each tile within a range of tiles that are located between two rows of racks. As an example, the range of tiles between the two rows of racks is 84 tiles in length and 4 tiles in width. Each tile is 2'×2' in size. At each tile location a temperature measurement is taken and data logged as a function of the xyz coordinates within the room. The inventive cart can be provided with any number of sensors and can be any shape or dimension. In this example, the cart is of the dimensions shown in FIG. 3.

Once data, whether temperature or otherwise, is detected by the sensors on the cart, the data is communicated either by wire or wirelessly to a computer or memory device where it is labeled and stored. By assigning colors or patterns to a range of temperatures, a graphically meaningful representation of the readings can be displayed. For instance, a graphical representation of the temperatures reported from the lowest row of sensors (1-9 as shown in FIG. 2) of a cart placed on each tile in the range of tiles can be displayed. In one example, the temperatures range from 18.4 degrees C. to 47.7 degrees C. Each successive row of sensors reports temperatures or other measurements at each incrementally increasing height until a maximum height of 8.5 feet is reached. Of course exact dimensions are mentioned for exemplary purposes only and the invention is not so limited.

Figure 11:
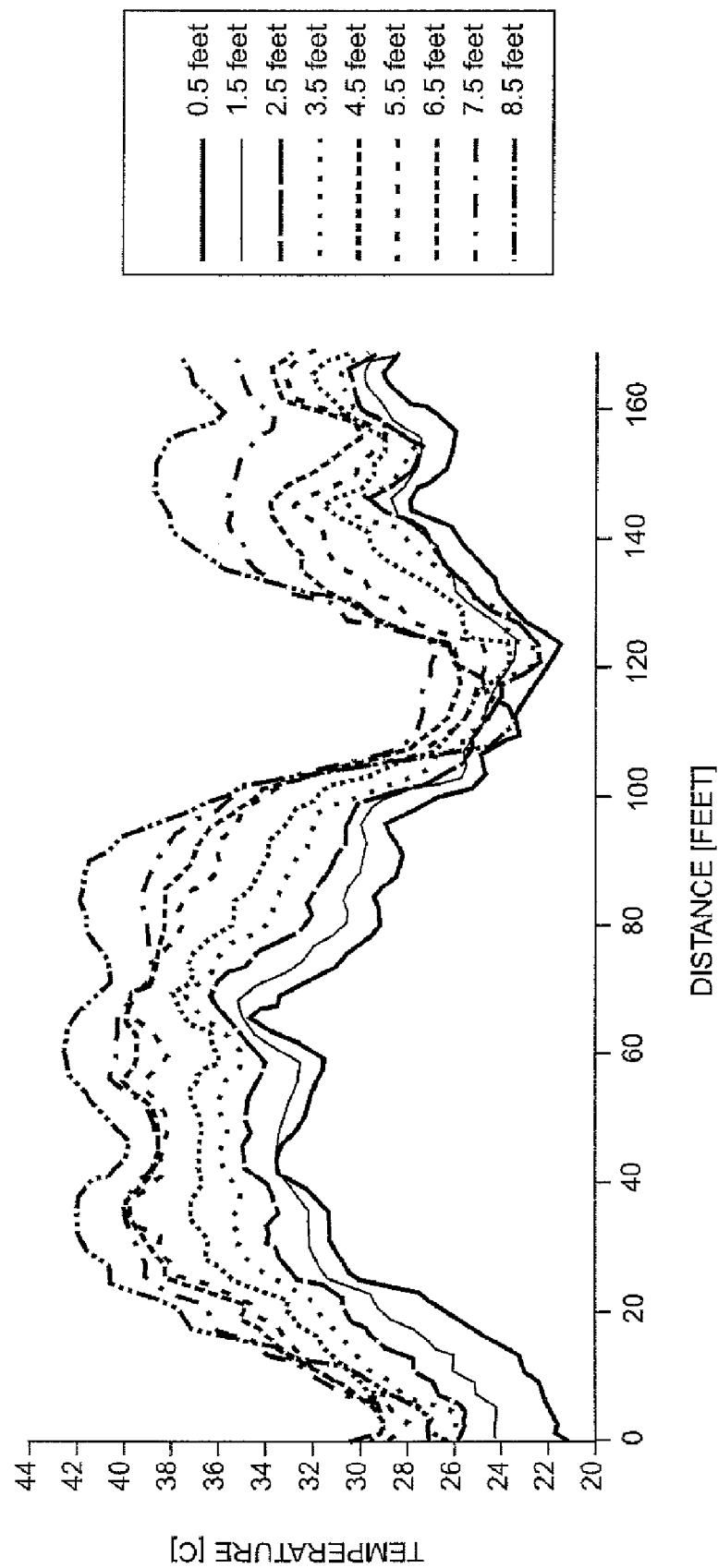
FIG. 11 is a two-dimensional graph of temperature readings from horizontal rows of sensors vs. distance along a lengthwise dimension within a data center, according to an embodiment of the present invention.

FIG. 11 shows a two-dimensional graph of the temperature readings of each horizontal row of sensors vs. distance along the lengthwise dimension of the range of tiles 908, according to the present example. Each line type is different and represents an individual horizontal row of sensors within the cart. The chart of FIG. 11 shows a single slice of the temperatures in the data center. In other words, the chart shows one pass of the cart along the 84 tiles. This type of graph can be repeated for each of the four rows of tiles, or any other resolution, between the two rows of racks 910 and 912. Additionally, the upper portion of the cart is a "T" shape that extends above the racks 908. Therefore, a chart can be also be created to show temperatures above the racks.

Figure 12:
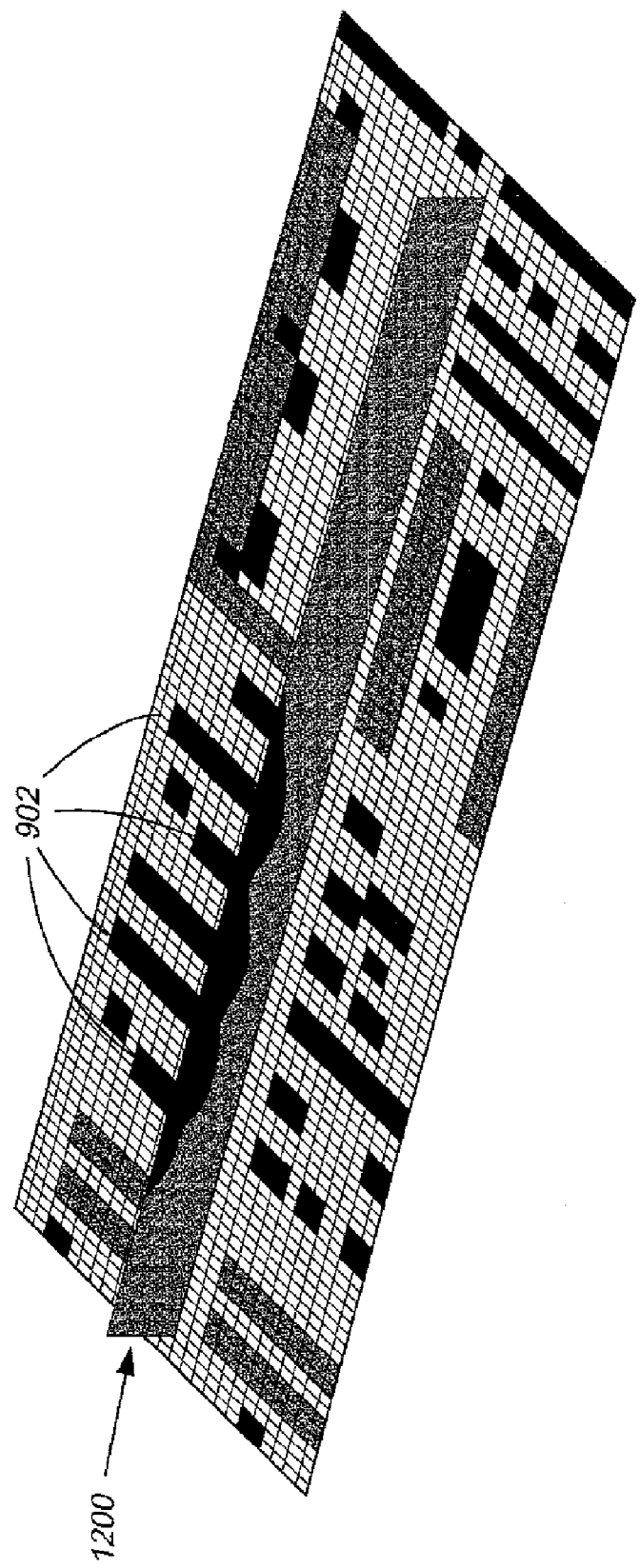
FIG. 12 is a three-dimensional representation of the information shown in FIG. 11, according to an embodiment of the present invention.

Referring now to FIG. 12, the data represented in the two-dimensional graph of FIG. 11 is shown in a three-dimensional representation 1200. A set of temperatures ranging from 18.4 degrees C. to 47.7 degrees C. is represented in the graph with each temperature range being represented by different shadings. In the three dimensional graph of FIG. 12, it can now easily be seen that the hot-spot areas within the center are adjacent the racks 902. Specifically, the hottest areas are not near the floor, where perforated tiles are allowing cool air to exit the ducted floor, but at a height near the top or above the racks. The three dimensional graph of FIG. 12 allows one to immediately see problem areas and plan cooling strategies around these areas. It is noted, however, that the graph of FIG. 12 shows the data captured with only one pass down the data center floor with the inventive cart. As will now be seen, the present invention advantageously allows for even more accurate servicing of spatial temperature characteristics within a data center.

As previously described, the "T" shaped cart can be moved to every unoccupied tile in the data center to capture readings. The cart dimensions are selected so that the "T" portion of the cart is able to extend over the racks and capture temperature or other readings above the racks as well. The data from the sensors, as well as xy coordinates and orientation data of the cart, is communicated to a computer that compiles the data and is able to output the data in various formats, such as a format that can be displayed graphically.

Process Flow

Figure 13:
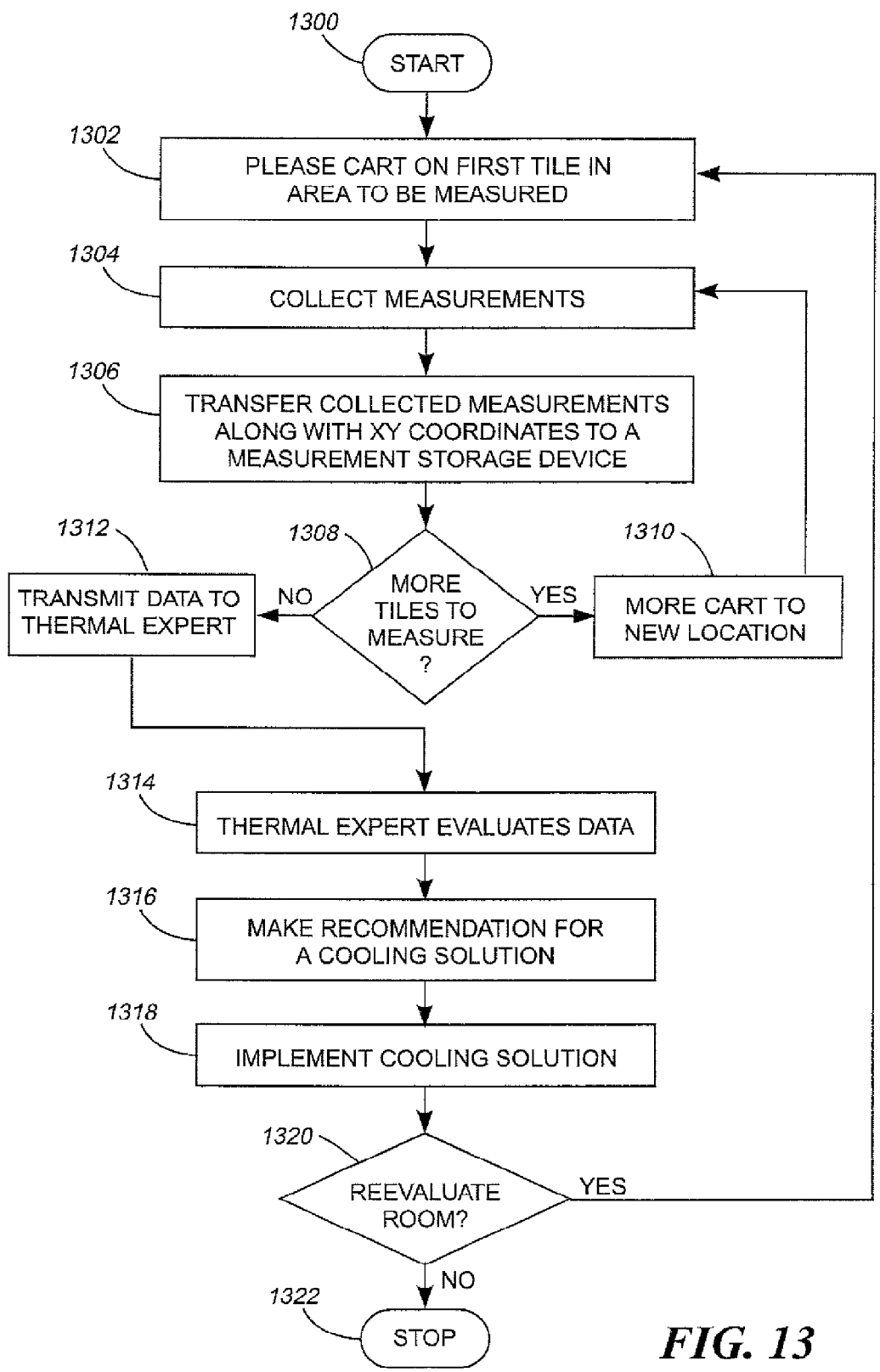
FIG. 13 is a process flow diagram according to one embodiment of the present invention.

FIG. 13 shows a process flow chart of one embodiment of the present measurement system. The flow begins at step 1300 and moves directly to step 1302, where the cart is placed on a first tile in an area to be measured. Sensors on the cart collect measurements in step 1304. The collected measurements, along with xy coordinates, cart location and orientation information, are then transferred to a measurement storage device in step 1306. In decision step 1308, a check is performed to see if any other tiles need to be measured. If the answer is "yes," the flow moves to step 1310 where the cart is moved to a new tile location. The flow then moves back to step 1304 where sensors collect new measurements above the new tile location. The flow continues as described above until the decision step 3308 is reached again.

If the answer to decision step 1308 is "no," flow moves to step 1312 where the data from all the sensors in all the tile locations is transmitted to a thermal expert. The thermal expert, in step 1314, evaluates the data. After the data has been evaluated, the thermal expert makes a recommendation for a cooling solution in step 1316. The cooling solution is implemented in step 1318. Decision step 1320 asks whether the room needs to be reevaluated to determine the effectiveness of the cooling solution implemented. If the answer is "yes," the flow moves back up to step 1302 where the cart is placed back on the first tile. In practice, the tile order in unimportant and the data can be taken in any order. If the answer to decision step 1320 is "no," the flow moves to step 1322 and stops.

It should be noted that with each iteration of implementing the thermal expert's recommendations, the region of interest shrinks smaller and smaller. It is contemplated that each iteration of measurements will be taken around a smaller region than the previous measurement.

CONCLUSION

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

| "Example of a Fortran-Type Computer Code" | |
|---|---|
| nx=31 | ; *** total tile x-coordinates |
| ny=29 | ; *** total tile y-cooridnates |
| backtemp=20.0 | ; *** background temp |
| dnu_files=579 | ; *** number of files in the netlist |
| gtemp=fltarr(nx*3,ny*3,9) | |
| gtemp(*,*,*)=backtemp | |
| cb=fltarr(3,3,9) | |
| lb=fltarr(3,3,2) | |
| rb=fltarr(3,3,2) | |
| ; *** read netlist | |
| ; *** co(0,*) filename | |
| ; *** co(1,*) tile x-coordinate | |
| ; *** co(2,*) tile y-coordinate | |
| ; *** co(3,*) orientation of the cart (E,W,N,S) | |
| ; *** co(4,*) is which sides are used (R,L) | |

-continued

"Example of a Fortran-Type Computer Code"

```
; *** co(5,*) directory of the files
; for 0 no sides are used
; for 1 left side is used
; for 2 right side is used
co=strarr(7,nu_files)
status=dc_read_free('c:\...\netlist.txt',co,/Column,Delim='\011')
; *** assume that netlist is saved from origin with tab as delim
; *** read all the temperature files and put them into one block
for i=0,nu_files-1 do begin
    if co(5,i) EQ '1' then
name=strcompress('c:\...\POK_DataCenter1_0517\'+co(0,i)+'.txt',/remove_all)
    if co(5,i) EQ '2' then
name=strcompress('c:\...\POK_DataCenter_0518\'+co(0,i)+'.txt',/remove_all)
    if co(5,i) EQ '3' then
name=strcompress('c:\...\POK_DataCenter_0519\'+co(0,i)+'.txt',/remove_all)
        status=dc_read_free(name,d)
        cb(*,*,*)=0.0
        lb(*,*,*)=0.0
        rb(*,*,*)=0.0
; *** for the center block
        q=0
        for iz=0,8 do begin
            for ix=0,2 do begin
                for iy=0,2 do begin
                    cb(ix,iy,iz)=d(q)
                    q=q+1
                end
            end
        end
; *** for the left block
        if co(4,i) EQ 'L' or co(4,i) EQ 'R,L' or co(4,i) EQ 'L,R' then begin
        q=81
        for iz=0,1 do begin
            for ix=0,2 do begin
                for iy=0,2 do begin
                    lb(ix,iy,iz)=d(q)
                    q=q+1
                end
            end
        end
    end
; *** for the right block
        if co(4,i) EQ 'R' or co(4,i) EQ 'R,L' or co(4,i) EQ 'L,R' then begin
        q=99
        for iz=0,1 do begin
            for ix=0,2 do begin
                for iy=0,2 do begin
                    rb(ix,iy,iz)=d(q)
                    q=q+1
                end
            end
        end
    end
    if co(4,i) EQ 'L' then print, lb(*,*,*)
    tx=fix(co(1,i))
    ty=fix(co(2,i))
    if co(3,i) EQ 'W' then ori=0
    if co(3,i) EQ 'S' then ori=1
    if co(3,i) EQ 'E' then ori=2
    if co(4,i) EQ 'N' then ori=3
    gtemp(tx*3:tx*3+2,ty*3:ty*3+2,*)=rotate(cb(*,*,*),ori)
; *** left and right for west (0)
    if co(4,i) EQ 'L' and ori EQ 0 then begin
        gtemp((tx-1)*3:(tx-1)*3+2,ty*3:ty*3+2,7:8)=rotate(lb(*,*,*),ori)
    end
    if co(4,i) EQ 'R' and ori EQ 0 then begin
        gtemp((tx+1)*3:(tx+1)*3+2,ty*3:ty*3+2,7:8)=rotate(rb(*,*,*),ori)
    end
    if (co(4,i) EQ 'R,L' and ori EQ 0) or (co(4,i) EQ 'L,R' and ori EQ 0) then begin
        gtemp((tx-1)*3:(tx-1)*3+2,ty*3:ty*3+2,7:8)=rotate(lb(*,*,*),ori)
        gtemp((tx+1)*3:(tx+1)*3+2,ty*3:ty*3+2,7:8)=rotate(rb(*,*,*),ori)
    end
; *** left and right for south (1)
    if co(4,i) EQ 'L' and ori EQ 1 then begin
        gtemp(tx*3:tx*3+2,(ty-1)*3:(ty-1)*3+2,7:8)=rotate(lb(*,*,*),ori)
    end
    if co(4,i) EQ 'R' and ori EQ 1 then begin
```

-continued

"Example of a Fortran-Type Computer Code"

```
            gtemp(tx*3:tx*3+2,(ty+1)*3:(ty+1)*3+2,7:8)=rotate(rb(*,*,*),ori)
        end
        if (co(4,i) EQ 'R,L' and ori EQ 1) or (co(4,i) EQ 'L,R' and ori EQ 1) then begin
            gtemp(tx*3:tx*3+2,(ty-1)*3:(ty-1)*3+2,7:8)=rotate(lb(*,*,*),ori)
            gtemp(tx*3:tx*3+2,(ty+1)*3:(ty+1)*3+2,7:8)=rotate(rb(*,*,*),ori)
        end
; *** left and right for east (2)
        if co(4,i) EQ 'L' and ori EQ 2 then begin
            gtemp((tx+1)*3:(tx+1)*3+2,ty*3:ty*3+2,7:8)=rotate(lb(*,*,*),ori)
        end
        if co(4,i) EQ 'R' and ori EQ 2 then begin
            gtemp((tx-1)*3:(tx-1)*3+2,ty*3:ty*3+2,7:8)=rotate(rb(*,*,*),ori)
        end
        if (co(4,i) EQ 'R,L' and ori EQ 2) or (co(4,i) EQ 'L,R' and ori EQ 2) then begin
            gtemp((tx+1)*3:(tx+1)*3+2,ty*3:ty*3+2,7:8)=rotate(lb(*,*,*),ori)
            gtemp((tx-1)*3:(tx-1)*3+2,ty*3:ty*3+2,7:8)=rotate(rb(*,*,*),ori)
        end
; *** left and right for north (3)
        if co(4,i) LT 'L' and ori EQ 3 then begin
            gtemp(tx*3:tx*3+2,(ty+1)*3:(ty+1)*3+2,7:8)=rotate(lb(*,*,*),ori)
        end
        if co(4,i) GT 'R' and ori EQ 3 then begin
            gtemp(tx*3:tx*3+2,(ty-1)*3:(ty-1)*3+2,7:8)=rotate(rb(*,*,*),ori)
        end
        if (co(4,i) EQ 'R,L' and ori EQ 3) or (co(4,i) EQ 'L,R' and ori EQ 3) then begin
            gtemp(tx*3:tx*3+2,(ty+1)*3:(ty+1)*3+2,7:8)=rotate(lb(*,*,*),ori)
            gtemp(tx*3:tx*3+2,(ty-1)*3:(ty-1)*3+2,7:8)=rotate(rb(*,*,*),ori)
        end
end
print,max(gtemp(*,*,*)), min(gtemp(*,*,*))
; *** xy display all 9 layers in the data center with scaling
for i=0,8 do begin
    Window,i,XSize=12*nx, YSize=12*ny
    TV,
bytscl(smooth(rebin(gtemp(*,*,i),12*nx,12*ny),4),Min=min(gtemp(*,*,*)),Max=max(gtemp(*,*,*)))
end
; *** xy display all 7 layers in the data center with scaling
test=fltarr(252,6)
for i=0,6 do begin
Window,i,XSize=504, YSize=12
test=gtemp(*,3:8,i)
TV, bytscl(smooth(rebin(test,504,12),6),Min=min(gtemp(*,*,*)),Max=max(gtemp(*,*,*)))
    end
; *** display line scans through the data center
; *** x-direction
v1x=fltarr(252)
v2x=fltarr(252)
voutx=fltarr(9,252)
for i=0,8 do begin
    v1x(*)=gtemp(*,5,i)
    v2x(*)=gtemp(*,6,i)
    voutx(i,*)=smooth((v1x(*)+v2x(*))/2,3)
end
status=dc_write_free('c:\...\linex.txt',voutx(*,*),/column)
; *** xz display middle layers in the data center with scaling
h=fltarr(252,9)
Window,0, XSize=504,YSize=18
h(*,*)=gtemp(*,5,*)
info,h
TVSCL,smooth(rebin(h,504,18),6)
End
```

What is claimed is:

1. A tangibly embodied computer program product for measuring physical characteristics within a data center, the tangibly embodied computer program product comprising:

a storage medium readable by a processing circuit and storing instructions for execution by the processing circuit for performing a method comprising:

contemporaneously measuring by a plurality of sensors at least one physical characteristic of an environment within the data center, the plurality of sensors being located on a framework, the plurality of sensors collectively defining one three-dimensional unit cell at the framework within the data center;

storing the measurements of the at least one physical characteristic on a data-storage device;

moving the framework through the data center at a set of defined incremental locations corresponding to one or more dimensions of the one three-dimensional unit cell such that the sensors are located at increments of the one three-dimensional unit cell within the data center to measure the at least one physical characteristic of the environment;

storing, based on moving the framework, location information of the framework within the data center on the data-storage device, wherein the location information corresponds to the set of defined incremental locations.

2. The tangibly embodied computer program product of claim 1, further comprising instructions for:

repeatedly placing the framework onto the set of defined incremental locations within the data center; and in response to the repeatedly placing, repeatedly measuring the at least one physical characteristic of the environment at the increments of the one three-dimensional unit cell at the framework within the data center.

3. The tangibly embodied computer program product of claim 1, further comprising instructions for:

producing a graphical representation from the measurements.

4. The tangibly embodied computer program product of claim 3, wherein the graphical representation comprises at least one of:

a spatial data slice;
a contour plot;
an image;
a histogram; and
a multi-dimensional graph.

* * * * *